United States Patent [19]

Schulz et al.

[11] Patent Number: 4,681,517
[45] Date of Patent: Jul. 21, 1987

[54] HYDRAULIC PUMP

[75] Inventors: René Schulz, Neu-Anspach; Heinz Teubler; Peter Breuer, both of Friedrichsdorf, all of Fed. Rep. of Germany

[73] Assignee: Vickers Systems GmbH, Fed. Rep. of Germany

[21] Appl. No.: 854,132

[22] Filed: Apr. 21, 1986

[51] Int. Cl.$^4$ .............................. F04B 49/00
[52] U.S. Cl. ...................... 417/300; 417/310
[58] Field of Search ............ 417/299, 300, 310

[56] References Cited

U.S. PATENT DOCUMENTS

| | | | |
|---|---|---|---|
| 3,349,714 | 10/1967 | Griewier | 417/300 |
| 3,723,025 | 3/1973 | Coakley | 417/299 |
| 4,396,033 | 8/1983 | Warumi | 417/300 |
| 4,549,566 | 10/1985 | Fujiwara | 417/300 |

FOREIGN PATENT DOCUMENTS

| | | | |
|---|---|---|---|
| 2652707 | 5/1978 | Fed. Rep. of Germany | 417/300 |
| 34997 | 4/1981 | Japan | 417/300 |

Primary Examiner—William L. Freeh
Attorney, Agent, or Firm—Barnes, Kisselle, Raisch, Choate, Whittemore & Hulbert

[57] ABSTRACT

A hydraulic pump with a falling characteristic curve in respect of the output flow relative to the pump speed. A flow control valve (40) has a spool (41) with a hollow (50) extension portion (49), and an annular chamber (52) with two control edges (53, 56) which co-operate with the valve output duct (38) and a relief duct (19) to form restrictor means which are in opposition to each other. The valve output duct (38) and the relief duct (19) are disposed substantially radially with respect to the spool.

7 Claims, 8 Drawing Figures

HYDRAULIC PUMP

TECHNICAL FIELD

The present invention relates to a hydraulic pump, in particular for steering power assistance, and more particularly to pumps having a falling characteristic of output versus rotational speed.

BACKGROUND OF THE INVENTION

Steering power assistance pumps are usually in the form of vane-type pumps and are rigidly connected to the drive engine of the motor vehicle in which the steering assistance system is used. Accordingly the pump delivery flow increases with increasing engine speed. However, there is generally no need for a strong steering power assistance effect when the engine is rotating at high speeds. For that reason, the systems generally use a flow control valve for bypassing a part of the pump delivery flow while the remaining regulated output flow is taken back to the tank by way of the steering valve. When that happens, the hydraulic fluid which is under what is referred to as dynamic pressure experiences release of pressure which results in a waste of energy, unless the power is used by the steering system. In a practical situation, in the high range of engine speeds, such a high level of power consumption does not occur because it is not possible to produce sharp steering movements when travelling quickly. Accordingly, in the high range of speeds of the pump the system maintains a constant condition of power readiness which is not required at that level and which thus results in an unnecessary waste of energy.

In order to overcome that disadvantage, it is already known for the flow control valve to be designed and arranged to provide that the useful flow-pump speed characteristic curve has a falling leg (German published specifications DE-A-No. 22 65 097 and DE-A-No. 26 52 707). The pressure inlet port to the flow control valve is arranged radially in that design, and likewise the relief passage, while the output flow is arranged axially, in the direction of movement of the spool of the flow control valve. The projection portion on the spool is in the form of a valve needle with needle head, the valve needle extending through the axial outlet so as to form a metering orifice whose width depends on the position of the needle head relative to the axial outlet. A disadvantage with that arrangement is that just very small changes in the position of the components result in considerable variations in the cross-sectional area of the axial outlet, through which the flow passes.

OBJECTS AND SUMMARY OF THE INVENTION

The object of the invention is to design a hydraulic pump having a falling characteristic of output versus rotational speed wherein a wide range of falling legs in said characteristic can be produced by slight alterations at the flow control valve. The invention therefore seeks to make it possible to produce a characteristic which is suited to the situation of use.

In accordance with the invention, the pump has a bypass flow control valve which includes a spool of special construction.

An annular chamber formed at an extension portion on the spool has a certain width of overlap with respect to a metering orifice bore and relief ducts means of which there are preferably two. The annular chamber is fed by a hollow chamber in the extension portion on the spool. In the annular chamber, the flow is divided up to provide the useful flow or output and the bypassed excess delivery flow. The latter is relieved over a short distance back into the inlet of the pump so that low levels of flow losses occur. The fact that the flow is divided in the annular chamber as indicated above has the further advantage that the pulse forces applied are in mutual opposition to each other, thus providing substantial compensation in respect of the flow forces acting on the spool.

In accordance with a development of the invention, the valve output duct has a second feed means formed by an annular gap between the extension portion on the valve spool and the wall of the valve bore in the region of movement of the extension portion. The feed cross-section of the second feed means is smaller than the normal cross-section of the opening between the annular chamber in the extension position and the valve output duct.

In accordance with further features of the invention, the extension portion on the valve spool may be of varying geometrical configurations in order to influence the configuration of the output pump speed characteristic.

The invention is described hereinafter with reference to the drawings:

DESCRIPTION

Figure 3:
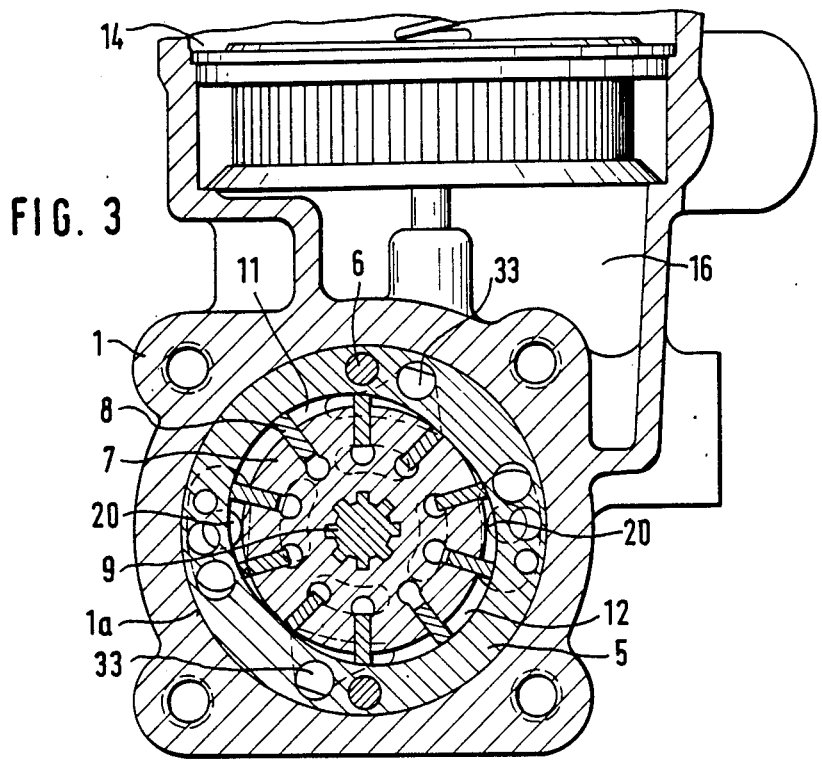
FIG. 3 is a view in cross-section taken along line III—III in FIG. 1.

The rotary vane pump comprises a main casing portion 1 and a casing cover portion 2 which enclose an internal cavity or chamber 1a which is sealed in relation to pressure fluid. Disposed in the internal chamber 1a and fixed with respect to the casing are a pressure plate 4 and a cam ring 5. The pressure plate 4 and the cam ring 5 are prevented from rotating by means of pins 6. Disposed within the cam ring 5 and between the casing cover portion 2 and the pressure plate 4 is a rotor 7 which, as shown in FIG. 3, has a plurality of radial guide slots. Vanes 8 are radially slidably mounted within the guide slots. THe rotor 7 is arranged to be driven by way of a shaft 9 which is mounted in a mounting bore in the casing cover portion 2. The rotor 7 is of a cylindrical configuration while the cam ring 5 is of an approximately oval internal configuration, with the minor axis thereof approximately corresponding to the diameter of the rotor while the major axis defines the distance by which the vanes 8 can extend from the rotor 7. In that way, defined between the cam ring 5 and the rotor 7 are two sickle-shaped displacement regions 11 and 12 which are subdivided by the vanes 8 into a plurality of cell spaces or chambers. At the suction side of the system, the cell spaces or chambers increase in size while they decrease in size at the pressure side.

Figure 2:
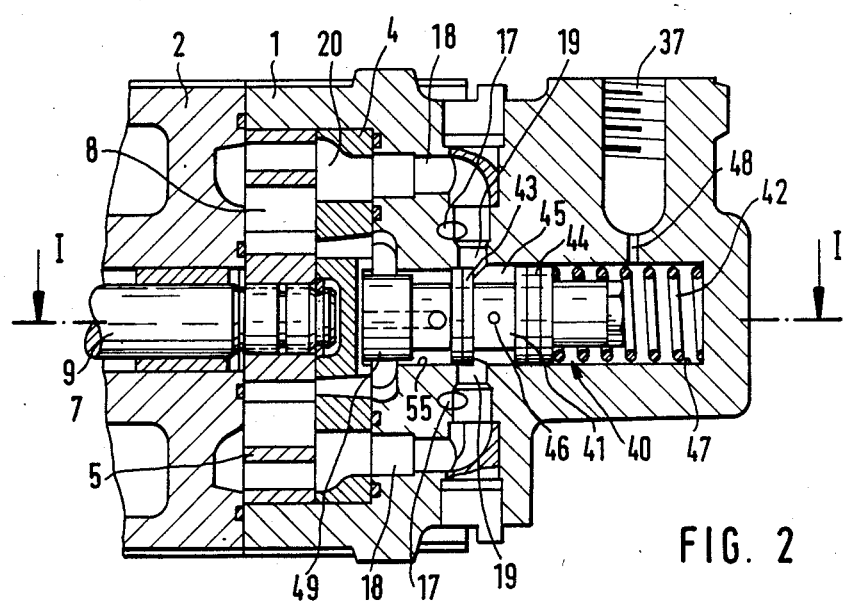
FIG. 2 is a partly broken-away view in horizontal longitudinal section taken along line II—II in FIG. 1.

Hydraulic fluid is supplied from a tank 14 (see FIG. 3) and a distributor region 16 by way of two bores 17 (see FIG. 2) which slope slightly downwardly, elbow-bent supply duct portions 18 and intake ports 20 into the respective displacement regions of the pump. The elbow-bent supply duct portions 18 each have a radial limb portion which communicates with a relief duct 19 (see FIGS. 2 and 4).

Figure 1:
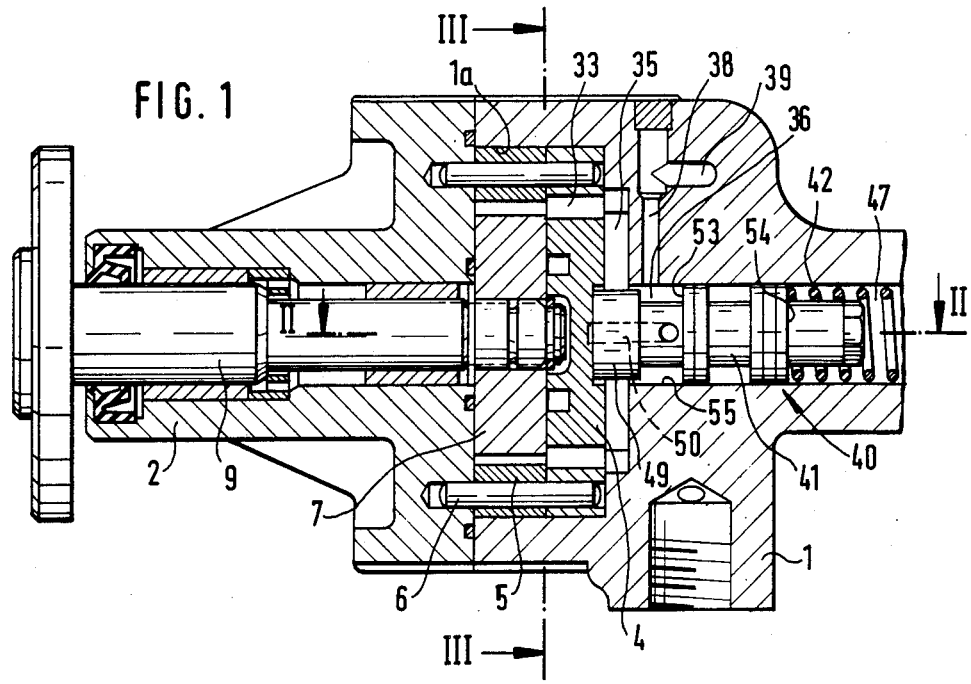
FIG. 1 is a partly broken-away view in vertical longitudinal section through a rotary vane pump.

The discharge of hydraulic fluid takes place by way of outlet ports 33 (see FIG. 1) through the pressure plate 4 on the rear side thereof into a pressure chamber 35. At a flow control valve 40, the pump delivery flow is divided into a controlled useful or output flow, which flows by way of a bore 38, to an external pump outlet 37 (see FIG. 2), and an excess delivery flow which is by-passed through the relief ducts 19. The bore 38 represents a valve or output duct and at the same time a part of a metering orifice 36 through which the output passes, with the pressure drop thereof being tapped off. The valve output flow passes by way of an inclined discharge duct 29 (see FIG. 1) to the pump outlet 37 (see FIG. 2). From there, a communication goes to a control chamber 47 of the flow control valve 40 by way of a damping throttle or restrictor means 48. The flow control valve 40 has a spool 41 which is guided in a valve bore 55 and which is urged towards the pressure plate 4 by the force of a spring 42 and which is possibly caused to bear against the pressure plate 4. The spool 41 has first and second spool faces 53 and 54 as well as shoulders or lands 43 and 44 between which extends an annular groove 45. The land 43 is narrower than the relief ducts 19 (FIG. 2) which meet the annular groove 45. From the annular groove 45, a duct 46 which extends partly radially and partly axially passes through the spool 41 into the control chamber 47 and the duct 46 is controlled by a ball valve which responds when a given permissible pressure in the control chamber 47 is exceeded, and thus relieves the control chamber 47 so that the spool 41 acts as a controlled pressure relief valve, as is known. Whether operating as a flow control valve or as a pressure relief valve, when it responds the valve 40 assumes the position shown in FIG. 4.

Figure 4:
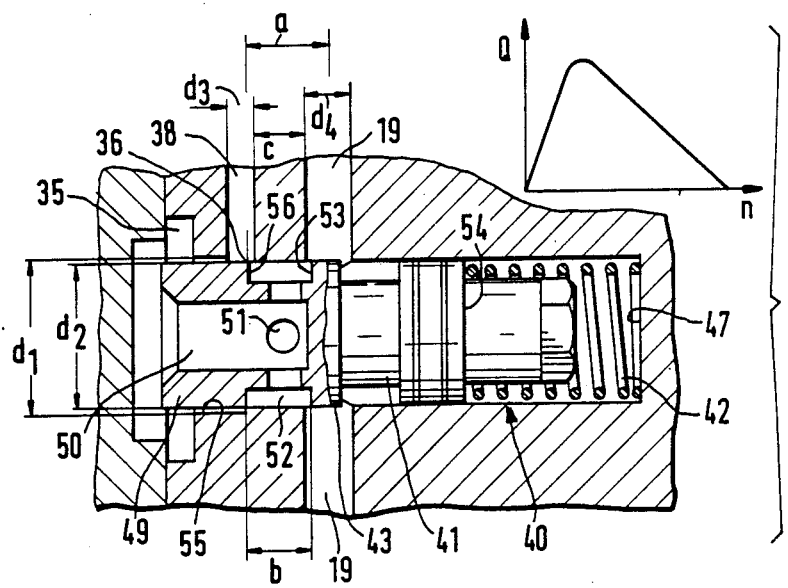
FIG. 4 is a diagrammatic view on an enlarged scale of a detail from FIGS. 1 and 2, and FIG. 5 through 8 show spool shapes and associated diagrams in respect of the output useful flow in relation to the pump speed.

The spool 41 has an extension portion 49 in which a hollow space or cavity 50 is disposed. It communicates by way of a series of bores 51 with an annular chamber 52 of a width b. The annular chamber 52 is defined by the first spool face 53 and a third spool face 56 which, co-operating with the relief ducts 19 and the valve output duct 38, operate as control edges so that the valve 40 represents a dual-edge control device. The radial bore 38 and the radial relief duct 19 are shown in FIG. 4 in the same axial plane of the valve 40 whereas in actual fact they are disposed in different axial planes which for example include an angle of 90° relative to each other. Projected on to the axial sectional plane shown in FIG. 4, there is a spacing a between the axes of the relief duct 19 and the bore 38, with a land thickness as indicated at c. The ducts 19 and 38 only need to be in a general radial direction with respect to the valve 40, the important consideration being that a land width c is formed. It will be seen that the spacing b is greater than the distance c, that is to say in a given position of the spool 41 the annular chamber 52 can connect the bore 38 to the relief duct 19. The diameter of the extension portion 49 is denoted by $d_2$ while the valve bore 55, in the region of the extension portion 49, is of a diameter indicated at $d_1$.

Operation of the pump is as follows:

The rotor 7 is driven by way of the shaft 9 and the vanes 8 pass through the displacement regions 11 and 12 so that fluid is fed by way of the fluid outlet system 33, 35, 50, 38 and 39 to the external or service pump outlet 37 and fluid is sucked in by way of the external pump inlet 16 and the fluid inlet system 17, 18 and 20. If the flow of fluid through the bore 38 exceeds the desired value, the pressure drop in the orifice 36 at the bore 38 is sufficiently high to overcome the force of the valve spring 42, in other words the pressure force acting on the face 53 is greater than the pressure force acting on the face 54 plus the spring force 42. A part of the delivery pump flow is now bypassed by way of the relief duct 19 while the valve output flow continues to be taken off by way of the bore 38. The effective cross-sectional area thereof decreases as a result of the control edge 56 moving in the closing direction, that is to say, the measuring orifice 36 is reduced in size and the pressure drop in the output flow increases.

FIG. 4 shows a diagram in respect of the controlled output flow Q in relation to the speed of rotation of the pump n when $d_1 \approx d_2$. As long as the annular chamber 52 only communicates with the bore 38, the output flow rises linearly with the speed of rotation n of the pump. Thereafter a progressively increasing part of the pump flow is bypassed until finally the control edge 56 completely shuts off the output flow. By virtue of the dimensions a, b, c, $d_3$, $d_4$ being of suitable magnitudes, it is possible to influence the configuration of the falling leg of the characteristic curve, that is to say the value n at which the output flow Q goes to zero can be defined.

Figure 5:
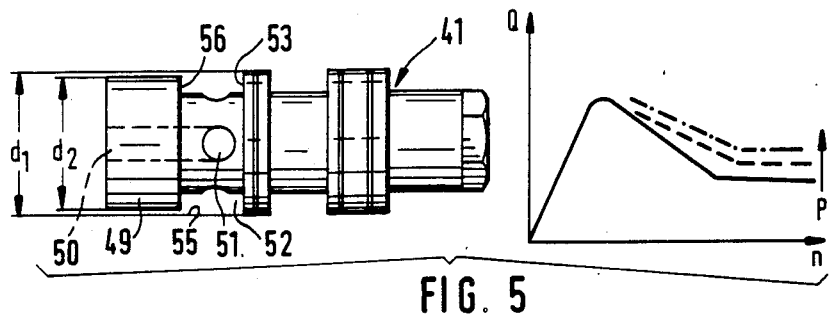

FIG. 5 shows a spool 41 on which the extension portion 49 is of a diameter $d_2$ which is smaller than the diameter $d_1$ of the valve bore 55. That arrangement forms an annular gap between the extension portion 49 and the valve bore 55, through which a flow can pass between the pressure chamber 35 and the bore 38, irrespective of the position of the spool 41. Therefore the flow Q does not fall back to zero when the edge 56 closes off the bore 38. It will be appreciated that the amount of fluid flowing through the annular gap depends on the pressure drop which occurs, as is indicated in the associated diagram by broken and dash-dotted lines.

Figure 6:
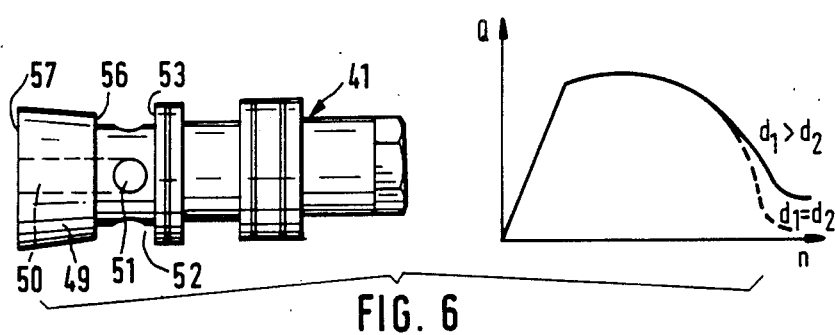

FIG. 6 shows a spool 41 on which the extension portion 49 is of a slightly conical or tapering configuration. THe annular chamber 52 therefore extends so-to-speak as far as the front edge 57 of the spool 41. If accordingly the spool 41 is moved against the force of its valve spring 42, the width of opening of the annular gap between the extension portion 49 and the valve bore 55 is reduced, with the rate of reduction rising greatly as the edge 57 approaches the valve bore 55 so that the proportion of the output flow which flows by way of the annular gap between the extension portion 49 and the valve bore 55 greatly decreases. Depending on the amount by which the inside diameter $d_1$ of the valve bore 55 is larger than the outside diameter $d_2$ of the extension portion 49 however, there is still a certain proportion of the output flow flowing, as shown in the associated characteristic curve.

Figure 7:
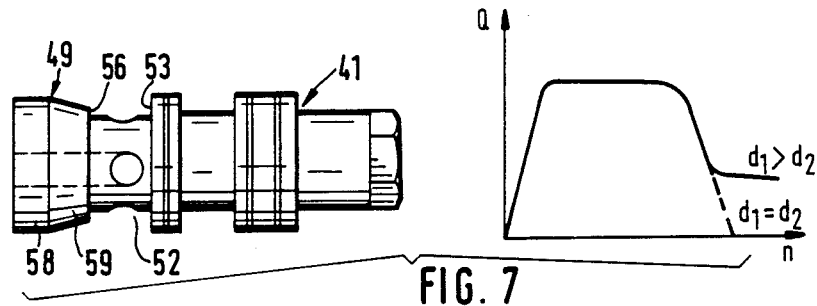

FIG. 7 shows a spool 41 with an extension portion 49 which is a composite from the shapes of the extension portions shown in FIGS. 5 and 6, comprising therefore a cylindrical region 58 and a conical or tapering region 59. When the face 53 comes into communication with the relief duct 19, a progressively increasing proportion of the delivery pump flow is relieved, but a given proportion of the output flow can flow through the annular gap between the tapering region 59 and the valve bore 55, into the bore 38, until, when the spool 41 is in a given position, the cylindrical region 58 passes into the valve bore 55. Depending on the amount by which the outside diameter $d_2$ of the cylindrical region 58 is smaller than the inside diameter $d_1$ of the valve bore, the arrangement then provides a residual output flow of larger or smaller magnitude, as indicated in the associated output flow-pump speed characteristic curve.

Figure 8:
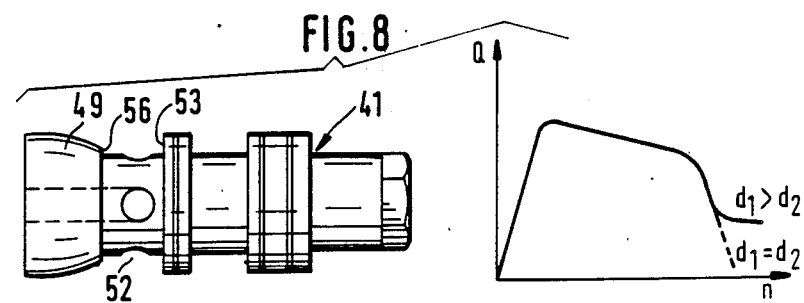

FIG. 8 shows an embodiment of the spool 41 with an extension portion 49 having a spherical surface. That shape approximates to the configuration shown in FIG. 7 and accordingly it provides a similar output flow-pump speed characteristic curve.

In tests which were carried out, the dimensions a, b, c, $d_1$, $d_2$, $d_3$ and $d_4$ were varied so that the configuration of the characteristic curves illustrated could be still further influenced. In the embodiment shown in FIG. 4, a was 10.3 mm, $d_4$ was 5.5 mm, $d_3$ was 3.1 to 6.0 mm and b was 7.7 to 10.7 mm.

With $d_3$, the output flow Q also increased, that is to say the maximum output flow was only attained at n=1700 l/min, instead of at n=1000 l/min, and it was accordingly higher. From there the flow Q fell to zero at about n=6—8000 l/min, with the higher values being attained at higher pressures. With relatively small values of b, the falling leg of the characteristic curve fell away more sharply than with relatively larger values of b.

In the embodiment shown in FIG. 5, the width of the gap defined by $d_1$ minus $d_2$ was varied from 0.21 to 0.71 mm. The greater the width of the gap, the shallower was the angle of inclination of the falling leg of the charateristic curve, relative to the zero line. At higher pressures, it was also possible to achieve a constant useful flow, irrespective of the pump speed n. The dimension b was varied between 7.7 and 8.7 mm, higher useful flow values being achieved at higher values in respect of b, that is to say the falling leg of the characteristic curve fell away less severely or remained constant.

It can thus be seen that the characteristic curve of the controlled output flow Q can be influenced in such a way that, after the valve responds, at a given pump speed, the magnitude of the controlled output flow Q is reduced as follows:

(a) with a rising pump speed n, slowly falling away to zero;
(b) with a rising pump speed n, slowly falling away to a minimum value, and
(c) with a rising pump speed n, initially constant and then falling away to zero or a minimum value.

In all cases the flow forces acting on the spool 41 are partially directed in opposition to each other, thus providing a substantial compensation effect.

We claim:

1. A hydraulic pump arrangement comprising
a hydraulic pump,
said hydraulic pump having a housing (1, 2) which includes a rotor cavity and a valve bore (55), and a rotor (7) which is driven at varying speeds (n), said housing including an inlet passage system (16, 17, 18, 19, 20) having inlet ports (20) and a relief duct (19), and outlet ports (33) connected to a pressure chamber (35),
said housing and said rotor forming at least one displacement region (11, 12) to which lead said inlet ports and outlet ports,
a flow control valve (40),
an output passage system (36, 37, 38, 39) including a valve output duct (38), a metering orifice (36) and an external pump outlet (37),
said pressure chamber (35) and said inlet passage system (16, 17, 18, 19, 20) communicating with each other by way of said control valve (40), which bypasses an excess delivery flow into said relief duct (19) of said inlet passage system and outputs a controlled output flow (Q) to said output passage system,
said flow control valve (40) including a spool (41) guided in said valve bore (55) of said housing and having a first higher pressure spool face (53) and a second lower pressure spool face (54), a valve spring (42) acting on said second spool face,
said metering orifice (63) being connected to said first and second faces (53, 54) so as to transmit a pressure drop of said controlled output flow (Q) at said orifice (36) to said spool (41),
the improvement wherein
said spool has an extension portion (49) and a hollow space (50) in it,
said spool extension (49) also having an outer annular chamber (52) limited by said first spool face (53) and a third spool face (56) which define an annular chamber width (b), and communicating with said pressure chamber (35),
said valve output duct (38) having an end extending generally radially in the direction of the flow control valve (40) and being at an axial spacing (c) from said relief duct (19) as considered in the direction of movement of said spool (41) which is less than said width (b) of said annular chamber (52),
said end of said output duct (38) forming said metering orifice (36) in cooperation with said third spool face (56), whose position reduces the effective width of said metering orifice (36) with increasing pump speed (n), thus producing a generally falling output flow-pump speed characteristic through said hollow space (50) in said spool (41).

2. A hydraulic pump as set forth in claim 1 wherein said extension portion (49) is of a tapering configuration with a surface (59) which tapers towards said annular chamber (52).

3. A hydraulic pump as set forth in claim 1 wherein said extension portion (40) has a spherical surface which is inclined towards said annular chamber (52).

4. A hydraulic pump as set forth in claim 1 wherein said annular chamber (52) is extended in the form of a gap at the outside periphery of said extension portion (40) on the spool (41).

5. A hydraulic pump as set forth in claim 1 wherein said extension portion (49) of said spool (41) is of an outside diameter ($d_2$) which is a small amount smaller than the inside diameter ($d_1$) of said valve bore (55) in the region of movement of said extension portion (49).

6. A hydraulic pump as set forth in claim 5 wherein said small amount is between 0.1 and 1 mm.

7. A hydraulic pump as set forth in claim 5 wherein said small amount is between 0.2 and 0.7 mm.

* * * * *